(12) United States Patent
Rosenzweig et al.

(10) Patent No.: US 6,505,251 B1
(45) Date of Patent: Jan. 7, 2003

(54) CONTROLLING THE RECEPTION OF A DATA SIGNAL STREAM OF A PROGRESSIVE FORMAT TYPE FILE

(75) Inventors: Michael D. Rosenzweig; Mark R. Leavy, both of Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/036,294

(22) Filed: Mar. 6, 1998

(51) Int. Cl.[7] ............................................. G06F 15/173
(52) U.S. Cl. ................... 709/231; 709/232; 375/240.17
(58) Field of Search ................................. 709/231, 232, 709/203, 217–219, 224, 228, 229; 375/240.17

(56) References Cited

U.S. PATENT DOCUMENTS

| | | | | |
|---|---|---|---|---|
| 4,222,076 A | * | 9/1980 | Kwowlton | 358/263 |
| 5,333,212 A | * | 7/1994 | Ligtenberg | 382/250 |
| 5,666,161 A | * | 9/1997 | Kohiyama et al. | 348/408 |
| 5,781,785 A | * | 7/1998 | Rowe et al. | 707/513 |
| 5,819,301 A | * | 10/1998 | Rowe et al. | 707/513 |
| 5,848,266 A | * | 12/1998 | Scheurich | 358/470 |
| 5,963,209 A | * | 10/1999 | Hoppe | 345/419 |
| 5,974,376 A | * | 10/1999 | Hassan et al. | 704/220 |

* cited by examiner

*Primary Examiner*—Mehmet B. Geckil
*Assistant Examiner*—Beatriz Prieto
(74) *Attorney, Agent, or Firm*—Trop, Pruner & Hu, P.C.

(57) ABSTRACT

A method and a storage medium are used with a computer. A signal stream of data that includes portions of a file is received by the computer. During the reception of the data, the signal stream is monitored to determine a quality level of the portions received from the signal stream. The quality level is compared with a predetermined threshold, and the reception of the signal stream is regulated based on the comparison.

30 Claims, 4 Drawing Sheets

CONTROLLING THE RECEPTION OF A DATA SIGNAL STREAM OF A PROGRESSIVE FORMAT TYPE FILE

BACKGROUND

The invention relates to receiving a data signal stream that is representative of data stored in a file.

Downloading a picture, or visual image, from a server (a server on the Internet, for example) into a computer typically includes downloading an image file. The image file includes information, or data, which describes how the image is to be "drawn" by the computer. For example, for a three-dimensional (3-D) image, the file might include data describing the location of selected points of the image. In an arrangement typically referred to as a 3-D mesh, the data in the file describes the image as a collection of triangles. In this manner, the data might describe, for example, vertices of the triangles. The file might also include data representing additional information about the triangles, such as the colors and textures of the triangles.

Typically, the file cannot be downloaded all at once, but instead, the file is downloaded in a piecemeal fashion via a data signal stream. The data signal stream might represent a series of records (of the file), each of which describes one or more features of the image. Quite often, the records are received one at a time by the computer, each in response to a request by the computer. Because a user of the computer may not want to wait for completion of the downloading before viewing some version of the image, the data in the file might be arranged in a progressive format.

In a progressive file format, the records are arranged so that records describing lower resolution versions of the image appear first in the stream of signal data. The computer uses the initial record(s) to draw a low resolution version of the image while still receiving the remaining records via the signal stream. In this manner, as the file is being transferred from the server to the computer, each record that is received may be used to progressively transform the lower resolution versions (of the image) that are displayed on the computer into progressively higher resolution versions.

Downloading the file may consume a considerable amount of time, especially if the file includes data describing a high resolution image. For example, a high resolution image may include in excess of ten thousand vertices and may consume a considerable amount of downloading time, as compared to a lower resolution version of the image. Recognizing that lower resolution versions of the image may be downloaded more rapidly than the higher resolution versions, a user may sometimes have an option to select between a file describing a high resolution image and another file describing a lower resolution image. However, many factors (size, detail and/or texture, as examples) besides resolution determine the quality of the image. As a result, a choice between resolutions usually does not aid the user in determining the quality of the end product after downloading is complete.

Thus, for the case where downloading only a portion of a file is desired, there is a continuing need for a technique that allows a user to select the quality of the portion to be downloaded.

SUMMARY

In one embodiment, a method includes monitoring a quality level of data being received from a file and regulating the reception of the data based on the monitored quality level.

In another embodiment, a method includes receiving a stream of data that is representative of data stored in a file. The stream is monitored to determine a quality level of a portion of the file. The quality level is compared with a predetermined threshold, and the reception of the stream is regulated based on the comparison.

In yet another embodiment, an article includes a computer readable storage medium for storing a program. The program includes instructions for causing a computer to receive a stream of data that is representative of data stored in a file. The program also includes instructions that cause the computer to monitor the stream to determine a quality level of the portion of the file. Instructions of the program cause the computer to compare the quality level with a predetermined threshold and also cause the computer to regulate the reception of the stream based on the comparison of the quality level with the predetermined threshold.

DETAILED DESCRIPTION

Figure 1:
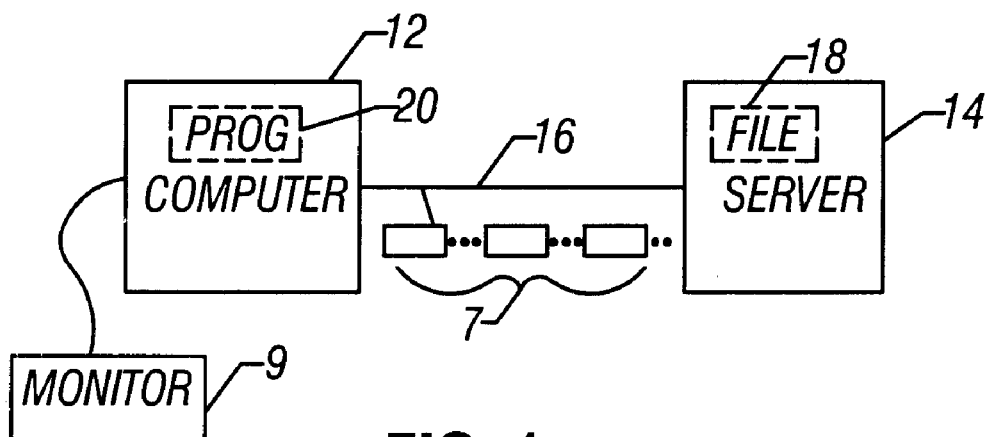
FIG. 1 is a block diagram of a computer system.

Referring to FIG. 1, an embodiment 20 of a program in accordance with the invention causes a computer 12 to download a file 18 from a server 14 in a piecemeal fashion until the portion of the file 18 that is downloaded meets a user selected quality level. To accomplish this, the program 20 may be configured to take advantage of quality markers. As described below, the quality markers may be placed in a signal stream 7 of data that delivers the file 18 to the computer 12.

In this context, the term "quality level" or "quality" of the file 18 generally refers to a predetermined indication of perceptual characteristic(s) (visual and/or audible characteristics, as examples) that can be created from a downloaded portion of the file 18, as compared to the perceptual characteristic(s) that can be created from the complete file 18 itself. In this manner, as the file 18 is being assembled, the quality markers are inserted into the file 18 to designate perceptual characteristics of portions of the file 18, as described below.

As an example of the perceptual characteristic(s), if the file 18 includes data that describes a picture, or image, the quality of the downloaded portion might be based on the appearance of an image drawn (by the computer 12) using the downloaded portion in relation to an image drawn using all of the file 18. In general, the computer 12 draws what is considered to be a higher quality version of the image (on a monitor 9 of the computer 12) when the version is based on all of the data contained in a file 18, and the computer 12 draws what is considered to be lower quality versions of the image when these versions are based on lesser portions, or subsets, of the file 18.

Figure 2:
FIGS. 2, 3 and 4 are illustrations of progressive three-dimensional (3-D) images.
Figure 3:
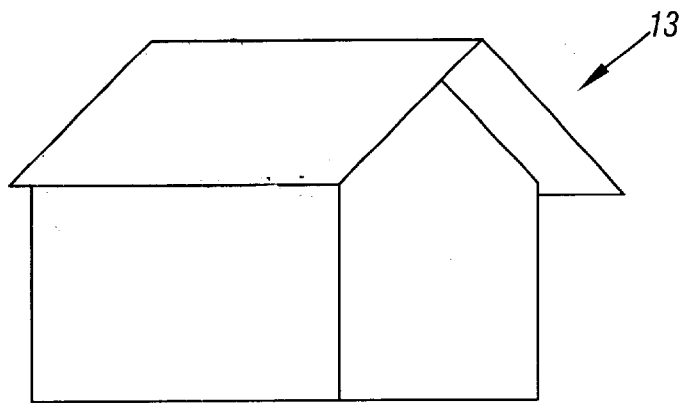

The data in the file 18 may describe, for example, an image 10 (see FIG. 2) of a house. In this manner, after downloading of the file 18 is complete, the computer 12 may reconstruct the image 10 which may include thousands of vertices and triangles, each of which describes part of the image. However, a user of the computer 12 may want to shorten the downloading time and likewise, see a lower quality version 13 (see FIG. 3) of the image.

To accomplish this, in some embodiments, the file 18 includes a progressive file (a 3-D progressive mesh file, for example) and as is typical with downloading progressive files, the computer 12 forms progressively better versions of the image 10 on the monitor 9 as more of the file 18 is downloaded. Thus, one of the first versions 19 of the image (see FIG. 4) drawn by the computer 12 might resemble a coarse outline of the image 10. The computer 12 progressively refines the version displayed on the monitor 9 as more of the file 18 is downloaded. Because the initial versions (of the image) drawn by the computer 12 are based on less data from the file 18, these initial versions might be considered to have lower quality levels, and as a result, the first portions of the file 18 might also be considered to have lower quality levels.

Figure 4:
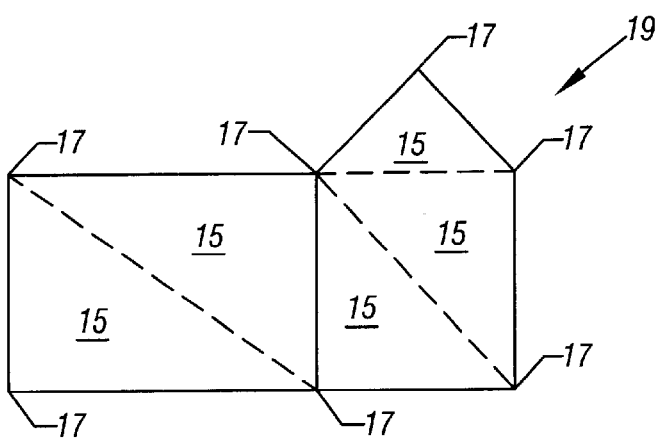

In some embodiments, the image 10 may be either a 2-D or 3-D image and may be formed from a collection of selectively placed triangles 15, as shown in FIG. 4. For the initial version 19 (of the image) drawn by the computer 12, the triangles 15 are relatively large and as a result, include a relatively small number of vertices 17.

In some embodiments, as the file 18 is being downloaded, the computer 12 receives updates from the signal stream 7 and uses these updates to refine the version (of the image 10) that is displayed on the monitor 9. These updates include data that may describe, for example, additional vertices 17 and triangles 15 to add to the currently displayed version of the image 10. Not only might new vertices be added, existing vertices of the currently displayed version of the image may be translated to new positions. Generally, the average area of the triangles 15 decreases as the computer 12 downloads more of the file 18.

Figure 5:
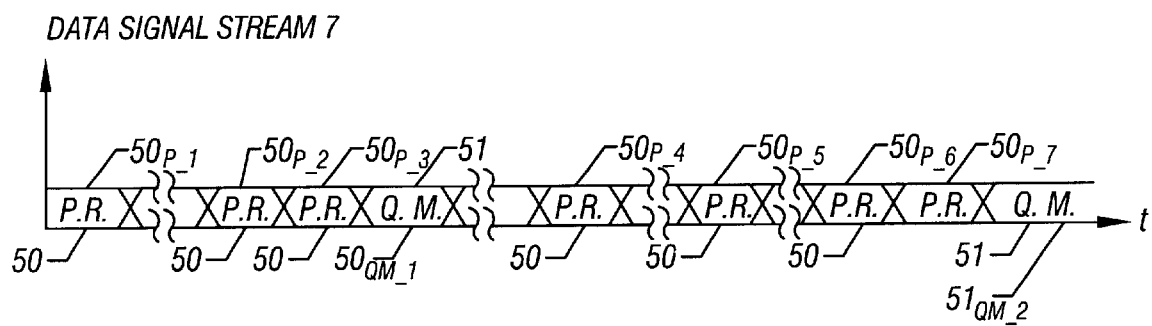
FIG. 5 is an illustration of a signal stream of data.

Referring to FIG. 5, in some embodiments, the data in the file 18 is packaged into records 50 which appear in the signal stream 7 of data during downloading. Some of the records 50 describe, for example, characteristics (header information, for example) of the file 18, and some of the records 50 are progressive records $50_P$ (records $50_{P\_1}$, $50_{P\_2}$, $50_{P\_3}$, $50_{P\_4}$, $50_{P\_5}$ $50_{P\_6}$, to $50_{P\_7}$, as examples). In some embodiments, the records $50_P$ are ordered in a sequence so that the quality of the currently displayed image improves as the computer 12 uses the data from each received record 50.

In some embodiments, the records 50 are transmitted one at a time from the server 14 to the computer 12, and the computer 12 requests the next record 50 before the server 14 transmits the next record 50 (records $50_{P\_1}$, $50_{P\_2}$, $50_{P\_3}$, $50_{P\_4}$, $50_{P\_5}$, $50_{P\_6}$, and $50_{P\_7}$, as examples). As an example, the progressive record $50_P$ may include data describing one vertex 17 of the image 10. Besides an additional vertex, the progressive record $50_P$ may also include, as examples, texture, opacity and color information.

In some embodiments, some of the records 50 may include quality markers 51 (see FIG. 5). The quality marker 51 indicates the quality of the portion of the file 18 that has already been transferred to the computer 12. For example, during the downloading of the file 18, if initially three progressive records $50_{P\_1}$, $50_{P\_2}$ and $50_{P\_3}$ are received and then followed by a record 50 that includes a quality marker $51_{QM\_1}$, then the quality marker $51_{QM\_1}$ indicates the quality of the first three progressive records $50_P$. The record 50 that includes the quality marker $51_{QM\_1}$ may or may not include data for the image 10. However, if so, then, in other embodiments, the marker 51 takes into account the additional data present in the record 50 that includes the marker 51. In the remaining description of this example, it is assumed that the record 50 including the marker $51_{QM\_1}$ does not include additional data describing the image 10.

Continuing the example, if four more progressive records $50_{P\_4}$, $50_{P\_5}$, $50_{P\_6}$ and $50_{P\_7}$ are received by the computer 12, and these records $50_P$ are followed in the signal stream 7 by another quality marker $51_{QM\_2}$, then this quality marker $51_{QM\_2}$ indicates the quality of the first seven progressive records $50_P$. In other embodiments, the quality markers 51 may indicate the quality of records yet to be transmitted over the signal stream 7 and/or a combination of the quality of the progressive records $50_P$ already transmitted and the progressive records $50_P$ awaiting transmission.

Thus, regardless of the transmission sequence of the quality markers 51 with respect to the progressive records $50_P$, the markers 51 indicate a quality of a portion of the file 18. As an example of the use of the quality markers 51, a "1" for the marker 51 may represent a ten percent quality for a particular portion of the file 18, a "4" for the marker 51 may represent a forty percent quality for that portion, and a "7" for the marker 51 may represent a seventy percent quality for that portion.

As an example, one way to assess a quality level of a portion of the file 18 might include a mathematical computation. In this manner, the pixel points or vertices of an image based on data from the portion of the file 18 might be compared to an image based on the entire file 18. Other ways to access quality of a portion of the file 18 may include subjectively interpreting the quality of an image that is based on that portion.

Figure 6:
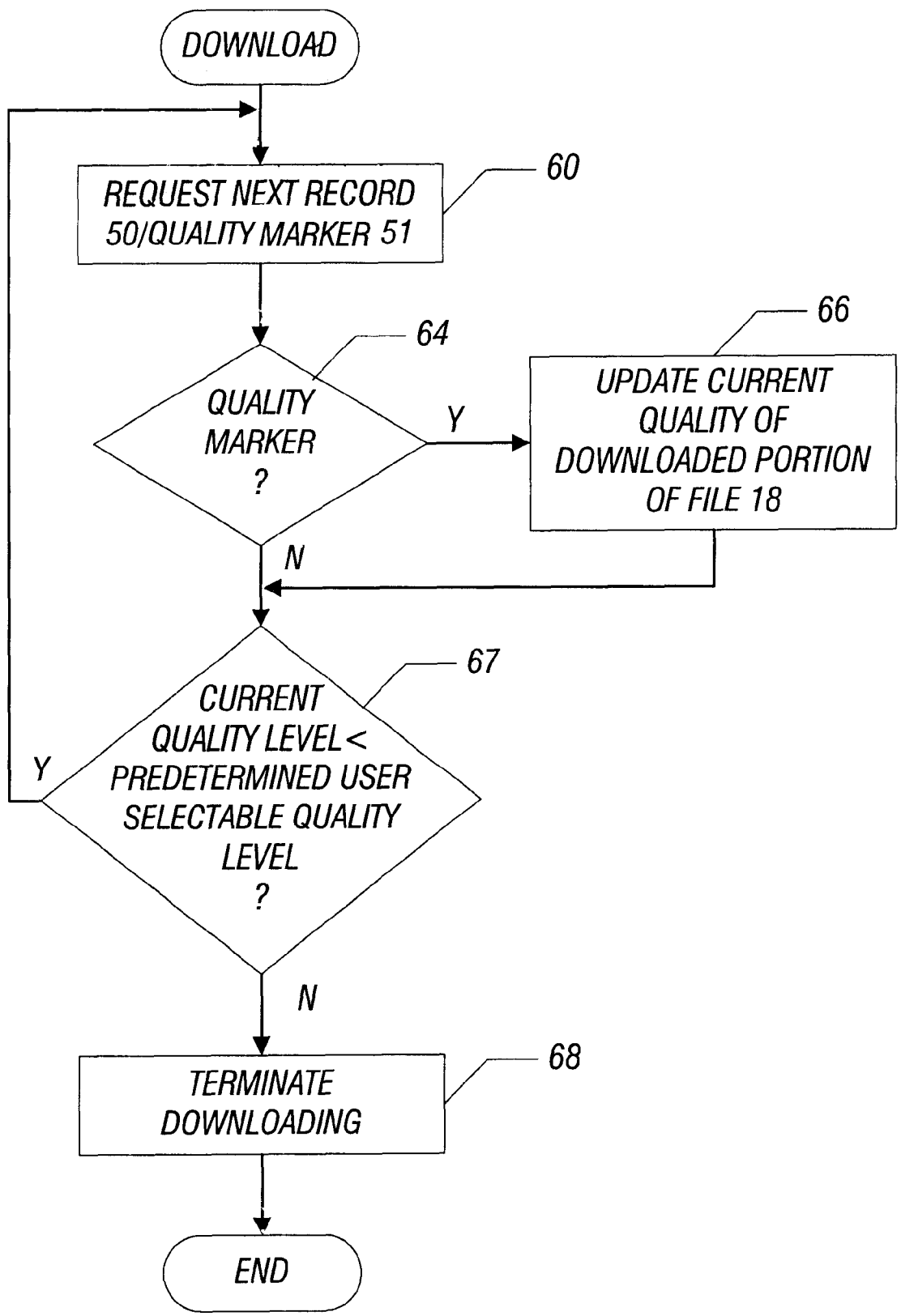
FIG. 6 is a flowchart of an algorithm to receive a stream of data that includes quality markers.

The computer 12 regulates the downloading of the records 50 based on the quality level indicated by the quality markers 51. For example, the computer 12 may determine if the portion of the file 18 already downloaded meets a user selected, predetermined quality level, and if this condition is met, the computer 12 may terminate the downloading. Referring to FIG. 6, the program 20 may include instructions that cause the computer 12 to regulate and monitor the downloading of the file 18. Under the direction of these instructions, the computer 12 requests (block 60) the next progressive record 14 or quality marker 51 from the server 14. If the computer 12 determines (diamond 64) that a quality marker 51 was received, then the computer 12 updates (block 66) a stored value that indicates a quality level of the portion of the file 18 that has been downloaded.

The computer 12 then compares (diamond 67) the current quality level to a predetermined, user selectable quality level. If the current quality level is less than the user selectable quality level, then the computer 12 requests (block 60) the next progressive record 50 or quality marker 51. Otherwise, the program 20 terminates (block 68) the downloading of the signal stream of data.

The program 20 might be stored on a computer readable medium, such as a floppy disk, a CD-ROM, a hard disk drive or a memory, as examples. The program might be, for example, an Internet browser.

Figure 7:
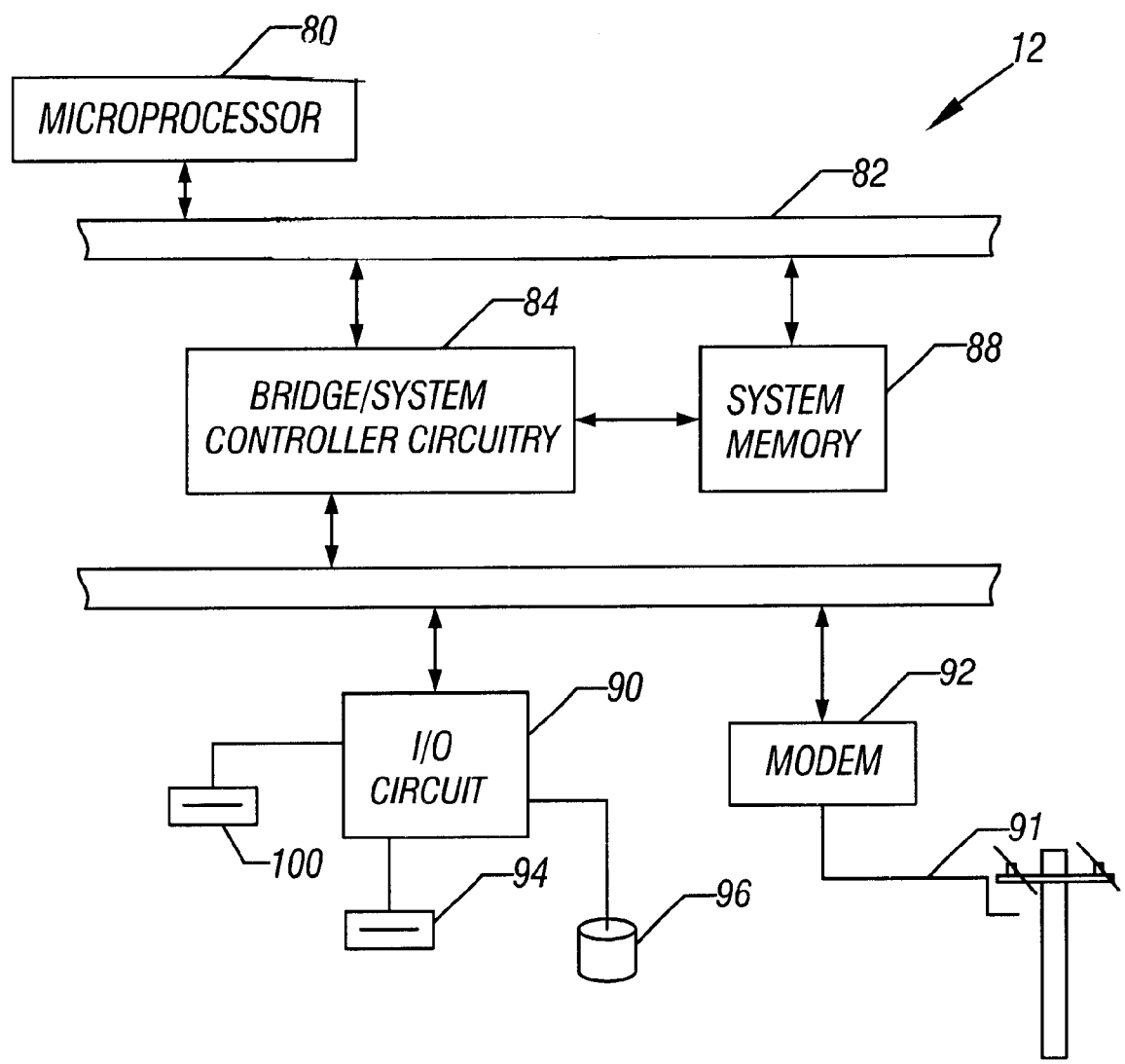
FIG. 7 is a block diagram of the computer of FIG. 1.

Referring to FIG. 7, in some embodiments, the computer 12 might include a microprocessor 80 which executes a copy of the program 20 that is stored in a system memory 88. The memory 88, the microprocessor 80 and bridge/system controller circuitry 84 are all coupled to a host bus 82. The circuitry 84 also interfaces the host bus 82 to a downstream bus 99 which is coupled to an I/O controller 90 and a modem 92. The modem 92 (and a telephone line 91) may couple the computer 12 to a communication link 16 between the computer 12 and the server 14. The server 14 may be used, for example, in connection with the Internet. The computer 12 may also have, as examples, a CD-ROM drive 100, a floppy disk drive 94 and/or a hard disk drive 96.

Instead of being downloaded, or retrieved from a server, in other embodiments, the file 18 might be retrieved, from a peripheral device of the computer 12. As examples, in other embodiments, the file 18 might be retrieved from a computer readable medium, such as a CD-ROM or a floppy disk that is inserted into the appropriate drive of the computer 12.

Instead of describing how the image is to be drawn, in other embodiments, the data in the file may represent the image itself. The quality markers 51 be used with files other than files that store image data. As examples, in other embodiments, the file might be a text file or a sound file. For example, the sound file may include data that represents a "clip" of stored sound. Other types of files are envisioned.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method for use with a computer, comprising:
   receiving a signal stream of data representative of data stored in a file, the signal stream of data progressively indicating a higher quality perceptual characteristic as the stream is received;
   monitoring the signal stream while the signal stream is being received to determine a quality level of the portion of the signal stream already received;
   comparing the quality level with a predetermined threshold; and
   regulating the receipt of the remainder of the signal stream based on the quality level comparison.

2. The method of claim 1, wherein the act of regulating comprises:
   terminating the receipt of data based on the quality level comparison.

3. The method of claim 1, wherein the signal stream of data includes a quality marker identifying the quality level of a portion of the file, and the act of monitoring includes detecting and reading the quality marker.

4. The method of claim 1, wherein receiving a signal stream includes receiving a plurality of records.

5. The method of 4, claim wherein receiving a signal stream includes receiving records in a progressive format.

6. The method of claim 1, including receiving a file of information describing a visual image.

7. The method of claim 1, including receiving a file of information describing sound.

8. The method of claim 1, including receiving a user selectable quality level and comparing the user selectable quality level with a predetermined threshold.

9. The method of claim 1, including receiving a signal stream of data having quality markers, one of the quality markers identifying the quality level of the portion of the file and the other quality markers identifying quality levels of other portions of the file.

10. The method of claim 1, wherein the monitoring the signal stream while the signal stream is being received comprises:
    automatically determining the quality level of the portion of the signal stream already received.

11. An article comprising a computer readable storage medium for storing a program including instructions for causing a computer to:
    receive a signal stream of data representative of data stored in a file, the signal stream of data progressively indicating a higher quality perceptual characteristic as the stream is received;
    monitor the signal stream while the signal stream is being received to determine a quality level of the portion of the signal stream already received;
    compare the quality level with a predetermined threshold; and
    regulate the reception of the remainder of the signal stream based on the comparison of the quality level with the predetermined threshold.

12. The article of claim 11, wherein the program further causes the computer to terminate the reception of the data based on the comparison of the quality level with the predetermined threshold.

13. The article of claim 11, wherein the signal stream of data includes quality markers, each quality marker identifying the quality level of the portions received from the signal stream, and the program further causes the computer to detect and read the quality markers.

14. The article of claim 11, wherein the portions of the data of the signal stream are arranged in records.

15. The article of claim 11, wherein the signal stream comprises a progressive signal stream.

16. The article of claim 11, wherein the file comprises information describing a visual image.

17. The article of claim 11, wherein the file comprises information describing sound.

18. The article of claim 11, wherein the predetermined level comprises a user selectable quality level.

19. The article of claim 11, wherein the signal stream of data comprises quality markers, one of the quality markers identifying the quality level of the portion of the file and the other quality markers identifying quality levels of other portions of the file.

20. The article of claim 11, wherein the instructions cause the computer to monitor the signal stream during the reception of the signal stream.

21. A computer system comprising:
    a processor; and
    a memory coupled to the processor, the memory storing instructions to cause the processor to:
    receive a signal stream of data representative of data stored in a file, the signal stream of data progressively indicating a higher quality perceptual characteristic as the stream is received;
    monitor the signal stream while the signal stream is being received to determine a quality level of the portion of the signal stream already received;
    compare the quality level with a predetermined threshold; and
    regulate the reception of the remainder of the signal stream based on the comparison of the quality level with the predetermined threshold.

22. The computer system of claim 21, wherein the processor terminates the reception of the data based on the comparison of the quality level with the predetermined threshold.

23. The computer system of claim 21, wherein the signal stream of data includes quality markers, each quality marker identifying the quality level of the portions received from the signal stream, and the processor further detects and reads the quality markers.

24. The computer system of claim 21, wherein the portions of the data of the signal stream are arranged in records.

25. The computer system of claim 21, wherein the signal stream comprises a progressive signal stream.

26. The computer system of claim 21, wherein the file comprises information describing a visual image.

27. The computer system of claim 21, wherein the file comprises information describing sound.

28. The computer system of claim 21, wherein the predetermined level comprises a user selectable quality level.

29. The computer system of claim 21, wherein the signal stream of data comprises quality markers, one of the quality markers identifying the quality level of the portion of the file and the other quality markers identifying quality levels of other portions of the file.

30. The computer system of claim 21, wherein the instructions cause the computer to monitor the signal stream during the reception of the signal stream.

* * * * *